United States Patent [19]
Wernick

[11] Patent Number: 6,085,853
[45] Date of Patent: Jul. 11, 2000

[54] DRIVE SYSTEM FOR MULTI-AXLE MOTOR VEHICLE

[75] Inventor: Gerhard Wernick, Neuzeug, Austria

[73] Assignee: Steyr-Daimler-Puch Aktiengesellschaft, Vienna, Austria

[21] Appl. No.: 09/145,996

[22] Filed: Sep. 2, 1998

[30] Foreign Application Priority Data

Sep. 10, 1997 [AT] Austria ................ 1524/97 U

[51] Int. Cl.$^7$ .................................. B62D 61/10
[52] U.S. Cl. ................... 180/24.09; 180/24.08; 180/24.11; 180/22; 180/24.12
[58] Field of Search .............. 180/24.09, 337, 180/374, 375, 383, 22, 24.08, 24.11, 24.12

[56] References Cited

U.S. PATENT DOCUMENTS

| | | | |
|---|---|---|---|
| 3,693,742 | 9/1972 | Eiler et al. | 180/24.09 |
| 3,976,154 | 8/1976 | Clark et al. | 180/24.05 |
| 4,823,897 | 4/1989 | Wohlfarth | 180/24.09 |
| 4,914,979 | 4/1990 | Balmforth | 475/221 |
| 4,966,244 | 10/1990 | Somerton-Rayner | 180/24.09 |
| 4,977,972 | 12/1990 | Hicks | 180/24.09 |
| 5,505,278 | 4/1996 | Smith | 180/246 |
| 5,931,255 | 8/1999 | Sewell | 180/374 |
| 5,950,750 | 9/1999 | Dong et al. | 180/24.09 |

*Primary Examiner*—Eric Culbreth
*Assistant Examiner*—L. Lum
*Attorney, Agent, or Firm*—Bachman & LaPointe P.C.

[57] ABSTRACT

The drive system for a motor vehicle having a front axle and a plurality of rear axles, which are driven or can be driven, consists of a central differential, an inter-axle differential, following the central differential in the direction of the power flow, between the front axle and a first rear axle, and a drive for two further rear axles, and axle differentials in each of the axles. In order to have as short and inexpensive a construction as possible and in order to use as few connecting shafts as possible, the central differential is constructionally combined with the inter-axle differential between front axle and first rear axle and with the axle differential of the first rear axle, and the central differential is arranged behind and the inter-axle differential is arranged in front of the axle differential.

4 Claims, 4 Drawing Sheets

DRIVE SYSTEM FOR MULTI-AXLE MOTOR VEHICLE

BACKGROUND OF THE INVENTION

The present invention deals with a drive system for a motor vehicle having a front axle and a plurality of rear axles, which are driven or can be driven, consisting of a central differential driven from an engine change-speed gearbox unit, an inter-axle differential, following the central differential in the direction of the power flow, between the front axle and a first, front, rear axle, and a drive for at least one further rear axle, and axle differentials in each of the axles.

Such drive systems having only one front axle and two rear axles in tandem arrangement are used, for instance, in trucks, and such drive systems having three rear axles are used in trucks for loads whose center of gravity lies very far to the rear. In all of these drive systems, an optimum distribution of the drive torques to the driven axles is aimed at. Since the wheel base between the two unsteered rear axles, which are present in any case, has to be kept very short, it is not possible to attach a central or inter-axle differential between these two axles in order to achieve a balanced torque distribution.

U.S. Pat. No. 4,977,972 discloses a system of the generic type in which the central differential is also arranged constructionally in front of the first rear axle and has three outputs, one each for the front axle and for the first rear axle and one for two further rear axles. The output for the second and third rear axles is passed through the casing of the axle differential of the first rear axle, but without being connected there.

A disadvantage with this arrangement is that the central differential, which is voluminous per se, comes to lie relatively far forward in the chassis of the vehicle, a factor which, given the length of a conventional engine gearbox unit, is very obstructive and completely rules out the design as a forward-control-type truck with center engine. It also requires a large number of very short universal-joint shafts, which must be especially short between central differential and first rear axle in order to be able to accommodate the central differential behind the engine gearbox unit. This increases costs and wear. In addition, the central differential arranged far forward has an adverse effect on the weight distribution of the unladen vehicle.

It is a principle object of the present invention to provide a drive system which avoids the foregoing disadvantages. The drive system is to have as short and as inexpensive a construction as possible and as few units and connecting shafts as possible.

SUMMARY OF THE INVENTION

According to the invention, the foregoing object is achieved in that (a) the central differential is constructionally combined with the inter-axle differential between front axle and first rear axle and with the axle differential of the first rear axle, and (b) the central differential is arranged behind and the inter-axle differential is arranged in front of the axle differential.

Thanks to the constructional combination of three differentials, costs, overall length and universal-joint shafts are saved. As a result of the special arrangement of the axle differential between the other two differentials, the overall length of the common casing is further reduced, and further the arrangement of the central differential behind the axle differential, that is deviating from the direction of the power flow, permits a long universal-joint shaft between the engine gearbox unit and the central differential or also a design of the vehicle with center engine. In addition, also the weight distribution when running empty is better as a result.

In a preferred embodiment, the central differential and the inter-axle differential are connected coaxially and by an intermediate shaft directed above the axle differential of the first rear axle. The foregoing leads to an especially compact type of construction and to linking of the differential parts which corresponds especially well to the direction of the power flow, in which case the intermediate shaft only needs to be very short.

An especially advantageous embodiment of the central differential as bevel-gear differential is possible if the vehicle has two further rear axles, namely a second and a third rear axle, a further inter-axle differential which is arranged downstream of the central differential in the direction of the power flow being constructionally combined with the axle differential of the second rear axle. It may be of the same construction as the inter-axle differential of the first rear axle.

In another embodiment, for vehicles having tandem rear axles, the central differential is a spur-gear epicyclic differential. By the use of such a differential, the torque distribution between the axles can be adapted to the requirements of the tandem arrangement of the rear axles.

Other advantages, features and details of the invention will be made clear from the following detailed description.

BRIEF DESCRIPTION OF THE DRAWINGS

The invention is described and explained below with reference to illustrations, in which.

DETAILED DESCRIPTION

Figure 1:
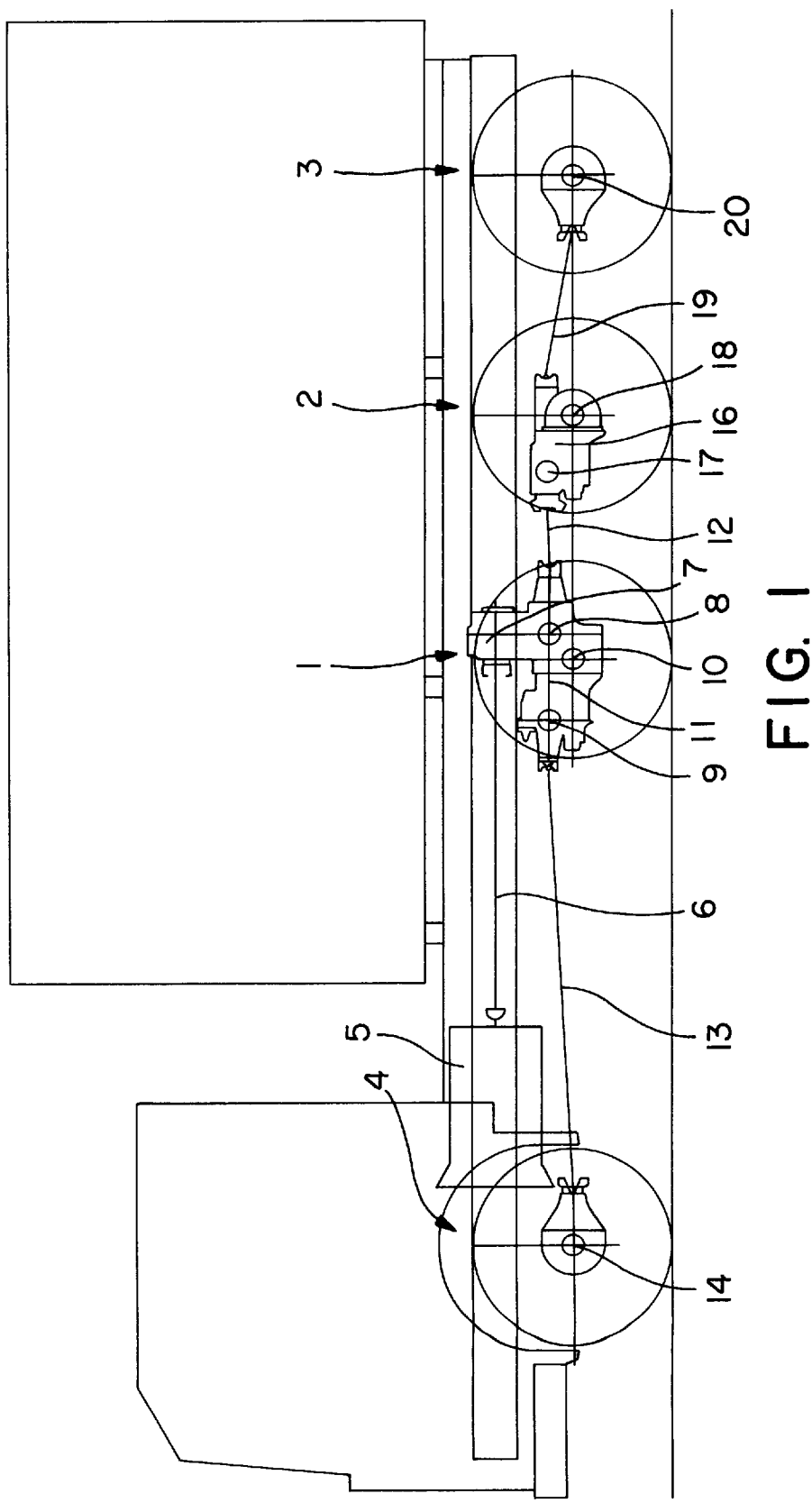
FIG. 1: shows a scheme of the drive system according to the invention for a truck having three driven rear axles.

The contours of a truck having three rear axles 1, 2, 3 and a front axle 4 are indicated roughly in FIG. 1. The rear axles are designated below as first (1), second (2) and third (3) rear axles. Starting from the engine gearbox unit, of which only the change-speed gearbox 5 is indicated, a first universal-joint shaft 6 leads to a differential unit 7 which contains a central differential 8, an inter-axle differential 9 and an axle differential 10 for the first rear axle. From the central differential 8, an intermediate shaft 11 leads on the one side to the inter-axle differential 9, and a second universal-joint shaft 12 leads on the other side to the second rear axle 2. From the inter-axle differential 9, a third universal-joint shaft 13 leads on the one side to an axle differential 14 of the front axle 4, and a drive connection leads on the other side to the axle differential 10 of the first rear axle.

Only in FIG. 1 is the second rear axle 2 provided with a further differential unit 16, which contains a further inter-axle differential 17 and an axle differential 18 of the second rear axle. From the further inter-axle differential 17, a fourth universal-joint shaft 19 leads to an axle differential 20 of the third rear axle. If the further inter-axle differential 17 is a bevel-gear differential, the torque fed in via the second universal-joint shaft 12 is distributed equally over the second rear axle 2 and the third rear axle 3.

Figure 2:
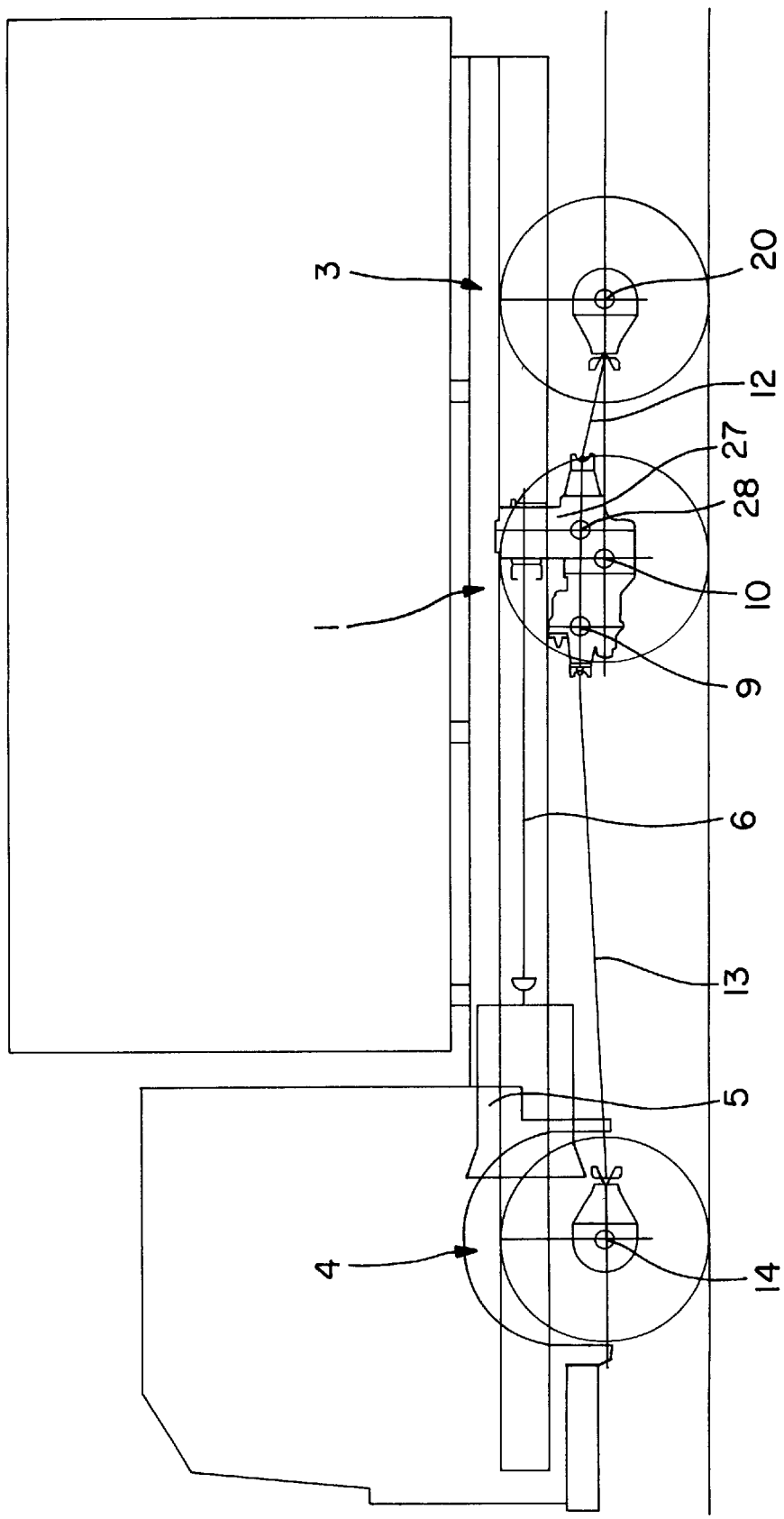
FIG. 2: shows a scheme of the drive system according to the invention for a truck having two driven rear axles.

The subject matter of FIG. 2 differs from that of FIG. 1 in that there are only tandem rear axles, and therefore there is only a third rear axle 3 together with the first rear axle 1. In accordance with the other requirements for the torque distribution, the differential unit 27 assigned to the first rear axle 1 contains a central differential 28 a spur-gear epicyclic differential. The second universal-joint shaft 12 therefore directly drives the axle differential 20 of the third rear axle. A second rear axle is not present.

Figure 3:
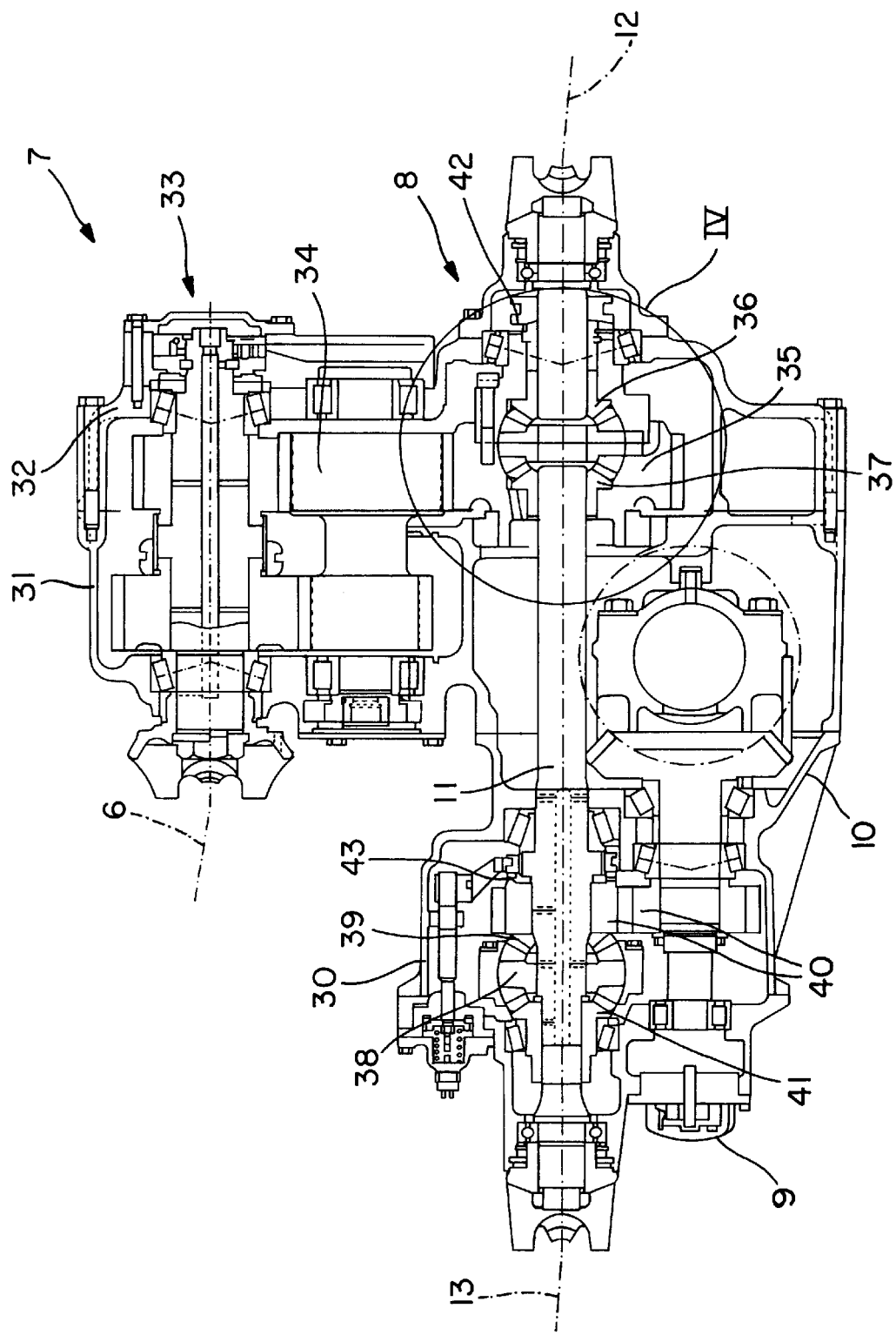
FIG. 3: shows a longitudinal section through the differential unit assigned to the first rear axle in a first embodiment.

The differential unit 7 corresponding to the vehicle depicted in FIG. 1 having three rear axles is shown in section in FIG. 3. Its casing consists of a front part 30, which accommodates the inter-axle differential 9, and a center part 31, which accommodates, at the bottom, the axle differential 10 for the first rear axle 1 and, at the top, together with a rear part 32 of the casing, a change-speed off-road gear stage 33. This off-road gear stage 33 ends with an output gear 34, which meshes with an external tooth system of the differential cage 35 of the central differential 8. The rear output bevel gear 36 of the latter is connected to the second universal-joint shaft 12 and thus leads to the second rear axle, its front output bevel gear 37 sits on the intermediate shaft 11, the other end of which carries the compensating-gear spider 38 of the inter-axle differential 9. The bevel gear 39 of the latter drives the axle differential 10 of the first rear axle via a spur-gear pair 40; the front output bevel gear 41 of the inter-axle differential is connected to the differential 14 of the front axle via the third universal-joint shaft 13.

A locking clutch for the central differential 8 is designated by 42, and a locking clutch for the inter-axle differential 9 is designated by 43. Since all differentials, central differential 8, inter-axle differentials 9 and 17, are bevel-gear differentials, the torque is halved in each case and a torque distribution of 25% results for each of the four driven axles.

Figure 4:
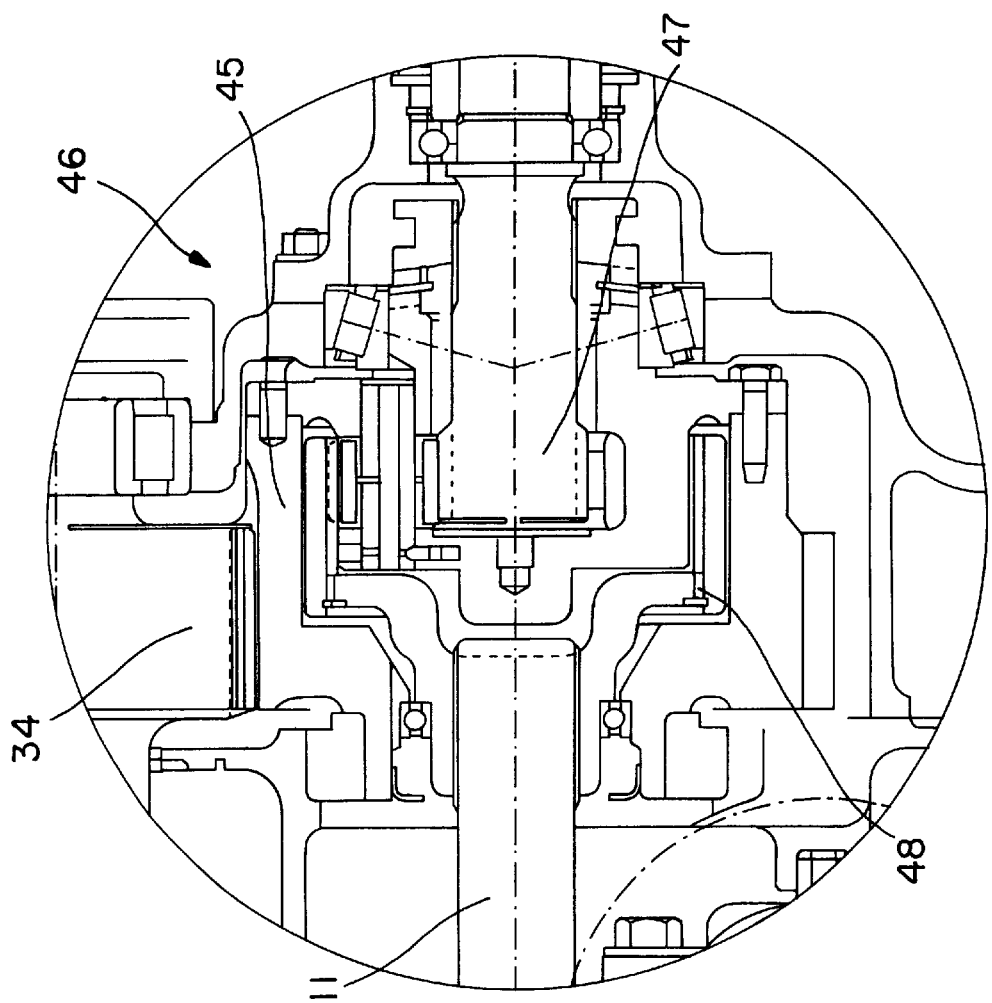
FIG. 4: shows a partial longitudinal section through the differential unit assigned to the first rear axle in a second exemplary embodiment.

FIG. 4 shows the area IV in FIG. 3 in a further embodiment. It differs only in that the central differential 8 in the bevel-gear type of construction of FIG. 3 is replaced by a spur-gear epicyclic differential 46 and in that the differential unit 27 thus created is assigned to a truck having rear axles in tandem arrangement according to FIG. 2. In order to obtain the requisite torque distribution, a torque distribution of approximately 70% to the inter-axle differential 9, this torque being further distributed equally to the front axle 4 and the first rear axle 1, and 30% to the third rear axle 3 is realized in the central differential 28 in this axle arrangement. A planet carrier 45 of the spur-gear epicyclic differential 46, by means of an additional external tooth system, meshes with the output gear 34 of the change-speed off-road gear stage 33. A sun gear 47 is connected to the second universal-joint shaft 12, and a ring gear 48 is connected to the intermediate shaft 11.

Various modifications and developments are envisaged within the scope of the invention. Thus the change-speed off-road gear stage 33 may be replaced by a fixed-speed transmission, whether a gear or a tension-belt transmission. The axle differentials may be connected to the wheels of the vehicle in various ways, in the case of a rigid axle to firmly mounted half shafts.

The application of the invention to vehicles having independently suspended wheels offers particular additional advantages. The connection is then made via half shafts and cardan joints. As a result, the unsprung masses can be considerably reduced and the spring excursions of the individual wheels can be increased.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A drive system for a motor vehicle having a front axle and a plurality of rear axles, which are capable of being driven, comprising a central differential driven from an engine change-speed gearbox unit; an inter-axle differential, following the central differential in the direction of the power flow and located between the front axle and a first, front, rear axle of said plurality of rear axles, and a drive for at least one further rear axle of said plurality of rear axles; and axle differentials in each of said front axle and plurality of rear axles, wherein (a) the central differential is constructionally combined with the inter-axle differential between the front axle and first, front, rear axle and with the axle differential of the first, front, rear axle, and (b) the central differential is arranged behind and the inter-axle differential is arranged in front of the axle differential.

2. The drive system as claimed in claim 1, wherein the central differential and the inter-axle differential are connected coaxially and are directed above the axle differential of the first rear, front, axle by an intermediate shaft.

3. The drive system as claimed in claim 1, wherein the central differential is a bevel-gear differential, wherein two further rear axles, namely a second and a third rear axle, are provided, a further inter-axle differential which is arranged downstream of the central differential in the direction of the power flow being constructionally combined with the axle differential of the second rear axle.

4. The drive system as claimed in claim 1, wherein the central differential is a spur-gear epicyclic differential and wherein only two rear axles are provided.

\* \* \* \* \*